(12) United States Patent
Ono et al.

(10) Patent No.: US 9,166,428 B2
(45) Date of Patent: Oct. 20, 2015

(54) CHARGING DEVICE

(75) Inventors: Tomoya Ono, Toyota (JP); Shigeki Kinomura, Toyota (JP); Michiaki Arasu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 14/126,541

(22) PCT Filed: Jul. 1, 2011

(86) PCT No.: PCT/JP2011/065163
§ 371 (c)(1),
(2), (4) Date: Dec. 16, 2013

(87) PCT Pub. No.: WO2013/005276
PCT Pub. Date: Jan. 10, 2013

(65) Prior Publication Data
US 2014/0111146 A1    Apr. 24, 2014

(51) Int. Cl.
*H02J 7/00* (2006.01)
*B60L 3/00* (2006.01)
*B60L 3/04* (2006.01)
*B60L 11/12* (2006.01)
*B60L 11/14* (2006.01)
*B60L 11/18* (2006.01)
*H01M 10/46* (2006.01)
*H01M 16/00* (2006.01)

(52) U.S. Cl.
CPC ............ *H02J 7/0042* (2013.01); *B60L 3/0069* (2013.01); *B60L 3/04* (2013.01); *B60L 11/123* (2013.01); *B60L 11/14* (2013.01); *B60L 11/1818* (2013.01); *B60L 11/1877* (2013.01); *H01M 10/46* (2013.01); *H01M 16/006* (2013.01); *B60L 2210/10* (2013.01); *B60L 2210/30* (2013.01); *B60L 2210/40* (2013.01); *B60L 2230/12* (2013.01); *B60L 2270/32* (2013.01); *B60L 2270/34* (2013.01); *Y02T 10/6217* (2013.01); *Y02T 10/7005* (2013.01); *Y02T 10/705* (2013.01); *Y02T 10/7077* (2013.01); *Y02T 10/7088* (2013.01); *Y02T 10/7216* (2013.01); *Y02T 10/7241* (2013.01); *Y02T 90/121* (2013.01); *Y02T 90/127* (2013.01); *Y02T 90/14* (2013.01)

(58) Field of Classification Search
CPC ...................................................... H02J 7/0042
USPC ................................................ 320/107, 109
See application file for complete search history.

(56) References Cited

U.S. PATENT DOCUMENTS

| | | | |
|---|---|---|---|
| 5,323,099 A | 6/1994 | Bruni et al. | |
| 5,461,299 A * | 10/1995 | Bruni | 320/108 |
| 5,478,250 A * | 12/1995 | Hoffman | 439/142 |
| 6,316,908 B2 * | 11/2001 | Kajiura | 320/104 |
| 8,172,599 B2 * | 5/2012 | Konchan | 439/352 |

(Continued)

FOREIGN PATENT DOCUMENTS

| | | |
|---|---|---|
| JP | A-6-14470 | 1/1994 |
| JP | A-2010-115037 | 5/2010 |
| JP | A-2010-161886 | 7/2010 |

(Continued)

*Primary Examiner* — Richard V Muralidar
(74) *Attorney, Agent, or Firm* — Oliff PLC

(57) ABSTRACT

A charging device includes a fixing member fixed to a fixed object, a cable holder mounted on the fixing member in an attachable and detachable manner and a charging cable unit mounted on the cable holder.

10 Claims, 17 Drawing Sheets

(56) References Cited

U.S. PATENT DOCUMENTS

| | | | |
|---|---|---|---|
| 8,860,366 B2 * | 10/2014 | Muller et al. | 320/109 |
| 8,890,473 B2 * | 11/2014 | Muller et al. | 320/109 |
| 2011/0037429 A1 * | 2/2011 | DeBoer et al. | 320/109 |
| 2011/0055037 A1 * | 3/2011 | Hayashigawa et al. | 705/26.1 |
| 2011/0246014 A1 * | 10/2011 | Sauper | 701/22 |

FOREIGN PATENT DOCUMENTS

| | | |
|---|---|---|
| JP | A-2010-226817 | 10/2010 |
| JP | A-2011-50125 | 3/2011 |

* cited by examiner

CHARGING DEVICE

TECHNICAL FIELD

The present invention relates to a charging device.

BACKGROUND ART

In consideration of the environment, much interest has been recently focused on a hybrid vehicle, an electric vehicle, a fuel-cell vehicle and the like equipped with a battery.

Also, much attention has been accordingly focused on a charging device for charging a battery mounted on a vehicle from outside the vehicle.

For example, a charging device disclosed in Japanese Patent Laying-Open No. 2010-226817 is a wall-hung type charging device. This charging device includes a cabinet for charging; a flat plate portion formed below the cabinet; a CCID holder formed in the flat plate portion; a CCID mounted on this CCID holder; and a charging cable connected to the CCID and hooked on to the cabinet.

Japanese Patent Laying-Open Nos. 06-014470, 2011-050125 and the like also disclose various types of charging devices.

CITATION LIST

Patent Document

PTD 1: Japanese Patent Laying-Open No. 2010-226817
PTD 2: Japanese Patent Laying-Open No. 06-014470
PTD 3: Japanese Patent Laying-Open No. 2011-050125

SUMMARY OF INVENTION

Technical Problem

In the charging device disclosed in Japanese Patent Laying-Open No. 2010-226817, a cable unit including a CCID, a cable and the like cannot be removed from the cabinet and the flat plate portion. This causes a problem that charging cannot be performed when a vehicle is stopped at some distance away from this charging device. A similar problem occurs also in the charging device disclosed in each of Japanese Patent Laying-Open Nos. 06-014470 and 2011-050125.

Furthermore, even if the cable unit can be simply removed from the device itself, a relatively longer cable may on the contrary lower the working efficiency during the subsequent charging operation.

The present invention has been made in light of the above-described problems, and an object of the present invention is to provide a charging device from which a cable holder equipped with a cable unit can be removed.

Solution to Problem

An electric power receiving device according to the present invention includes a fixing member fixed to a fixed object; a cable holder mounted on the fixing member in an attachable and detachable manner; and a charging cable unit provided in the cable holder and connected to a charging unit provided in a vehicle.

Preferably, the charging cable unit is provided so as to be removable from the cable holder.

Preferably, the charging cable unit includes a cable, a control unit connected to the cable and controlling electric power supplied to the charging unit, and a case housing the control unit. A case housing portion housing the case is formed inside the cable holder.

Preferably, the cable holder includes a back surface facing the fixing member in a state where the cable holder is mounted on the fixing member, a first protrusion formed on the back surface and protruding downward, and a second protrusion formed above the first protrusion and protruding downward. The fixing member includes a facing surface facing the back surface, a first receiving portion formed on the facing surface and receiving the first protrusion, and a second receiving portion receiving the second protrusion.

Preferably, the first protrusion is formed at a lower end of the back surface. The back surface has a window formed above the first protrusion, and the second protrusion is formed on an upper side portion of an opening of the window.

Preferably, the second protrusion includes a first side surface and a second side surface arranged in a width direction. The first side surface and the second side surface are formed to be inclined so as to come close to each other as extending downward.

Preferably, the second receiving portion includes a first side wall portion and a second side wall portion arranged in a width direction. When the second protrusion is inserted into the second receiving portion, an upper end of the first side surface and an upper end of the second side surface are brought into contact with the first side wall portion and the second side wall portion, respectively.

Preferably, the charging cable unit includes a cable; a first connecting portion provided at a first end of the cable and connected to a power supply; a second connecting portion provided at a second end of the cable and connected to the charging unit provided in the vehicle; a control unit disposed between the first end and the second end and controlling electric power supplied to the charging unit; and a case housing the control unit. The cable is wound around a peripheral surface of the cable holder. The cable holder includes a holding portion holding the second connecting portion. The second connecting portion mounted on the holding portion protrudes above the cable wound around the cable holder.

Preferably, the cable holder has a lower end at which a groove portion (77, 79) receiving the cable and an installation portion are formed. The installation portion protrudes below the cable within the groove portion. When the installation portion is disposed on a non-holding surface in a state where the cable is mounted on the case housing portion, the cable holder can be free-standing.

Preferably, the cable holder includes a back surface facing the fixing member in a state where the cable holder is mounted on the fixing member, and a through hole provided in the back surface. The fixing member includes a facing surface facing the back surface of the cable holder in a state where the cable holder is mounted, and a third protrusion formed on the facing surface and protruding toward the back surface. When the cable holder is mounted on the fixing member, the third protrusion is inserted into the through hole.

Preferably, the cable holder includes a back surface facing the fixing member in a state where the cable holder is mounted on the fixing member, and a gripping portion. One of the cable holder and the fixing member is provided with a protruding portion protruding toward the other of the cable holder and the fixing member. When the protruding portion is brought into contact with the fixing member or the cable holder in a state where the cable holder is mounted on the fixing member, a gap is provided between the gripping portion and the fixed object.

Preferably, the protruding portion is formed on the fixing member. The cable holder includes a back surface facing the fixing member in a state where the cable holder is mounted on the fixing member, a first protrusion formed on the back surface and protruding downward, and a second protrusion formed above the first protrusion and protruding downward. The fixing member includes a facing surface facing the back surface, a first receiving portion formed on the facing surface and receiving the first protrusion, and a second receiving portion receiving the second protrusion. The first receiving portion is formed on the protruding portion, and the second receiving portion is formed above the protruding portion.

Preferably, the charging cable unit includes a cable; a first connecting portion provided at a first end of the cable and connected to a power supply; a second connecting portion formed at a second end of the cable and connected to the charging unit; a control unit disposed in the cable between the first end and the second end; and a case housing the control unit. The case housing portion is provided with an insertion hole into which the case is inserted from above, and a slit formed so as to extend from an upper end to a lower end of the case housing portion. A part of the cable located between the case and the second connecting portion can pass through the slit.

Advantageous Effects of Invention

According to the charging device of the present invention, a cable unit can be removed while being mounted on the cable holder.

DESCRIPTION OF EMBODIMENTS

Referring to FIGS. 1 to 17, a charging device 40 according to the present embodiment will be hereinafter described. Although a description will be given in the present embodiment with regard to the case where charging device 40 is used to charge a battery B mounted in a hybrid vehicle, it goes without saying that this charging device 40 can also be applied to a vehicle equipped with a battery, such as an electric vehicle and a fuel-cell vehicle.

Figure 1:
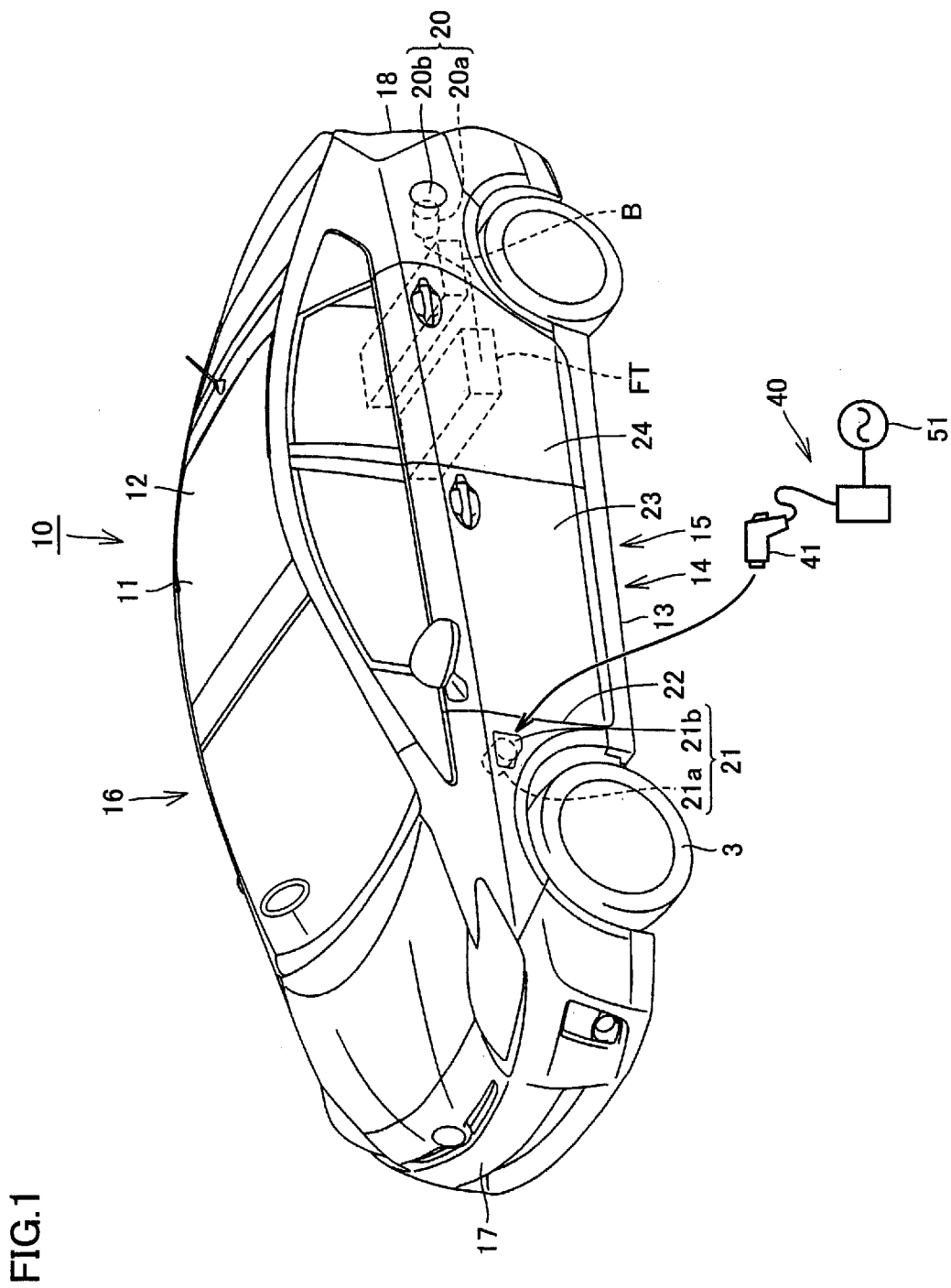
FIG. 1 is a perspective view schematically showing a charging device 40 and a vehicle 10.

FIG. 1 is a perspective view schematically showing a charging device 40 and a vehicle 10. As shown in FIG. 1, vehicle 10 charged by charging device 40 is a hybrid vehicle equipped with a fuel tank FT and battery B.

Vehicle 10 includes a body 11 forming the contour of vehicle 10; and fuel tank FT and battery B that are housed in body 11.

The surface of body 11 includes an upper surface 12, a lower surface 13 and a peripheral surface 14 that includes side surfaces 15 and 16, a front surface 17 and a back surface 18.

Side surface 15 is provided with a passenger entry/exit opening 22. Body 11 includes doors 23 and 24 opening and closing passenger entry/exit opening 22.

Side surface 15 is provided with an oil feeding portion 20 and a charging unit 21. Oil feeding portion 20 is located rearward of passenger entry/exit opening 22, and charging unit 21 is located forward of passenger entry/exit opening 22.

Oil feeding portion 20 includes a nozzle insertion portion 20a into which a nozzle portion of an oil feeding nozzle provided outside is inserted, and a cover portion 20b provided in body 11. When cover portion 20b is opened, an opening of nozzle insertion portion 20a is exposed to the outside, so that the nozzle of the oil feeding nozzle can be inserted into nozzle insertion portion 20a.

The nozzle insertion portion is connected to fuel tank FT, and the fuel supplied through nozzle insertion portion 20a is supplied to fuel tank FT. It is to be noted that a vehicle including an internal combustion engine may be supplied with a fuel, for example, gasoline, LP gas (liquefied petroleum gas), and the like. Furthermore, a vehicle including a fuel cell may be supplied with, for example, liquid hydrogen, ethanol and the like.

Charging unit 21 includes a charging connector 21a equipped with a charging plug provided outside and a cover portion 21b provided in body 11. When cover portion 21b is opened, charging connector 21a is exposed to the outside, so that charging plug 41 can be connected to charging connector 21a.

Charging connector 21a of charging unit 21 receives electric power from charging plug 41. Charging connector 21a is connected to battery B through a converter and the like, and battery B is charged with electric power supplied to charging unit 21.

Figure 2:
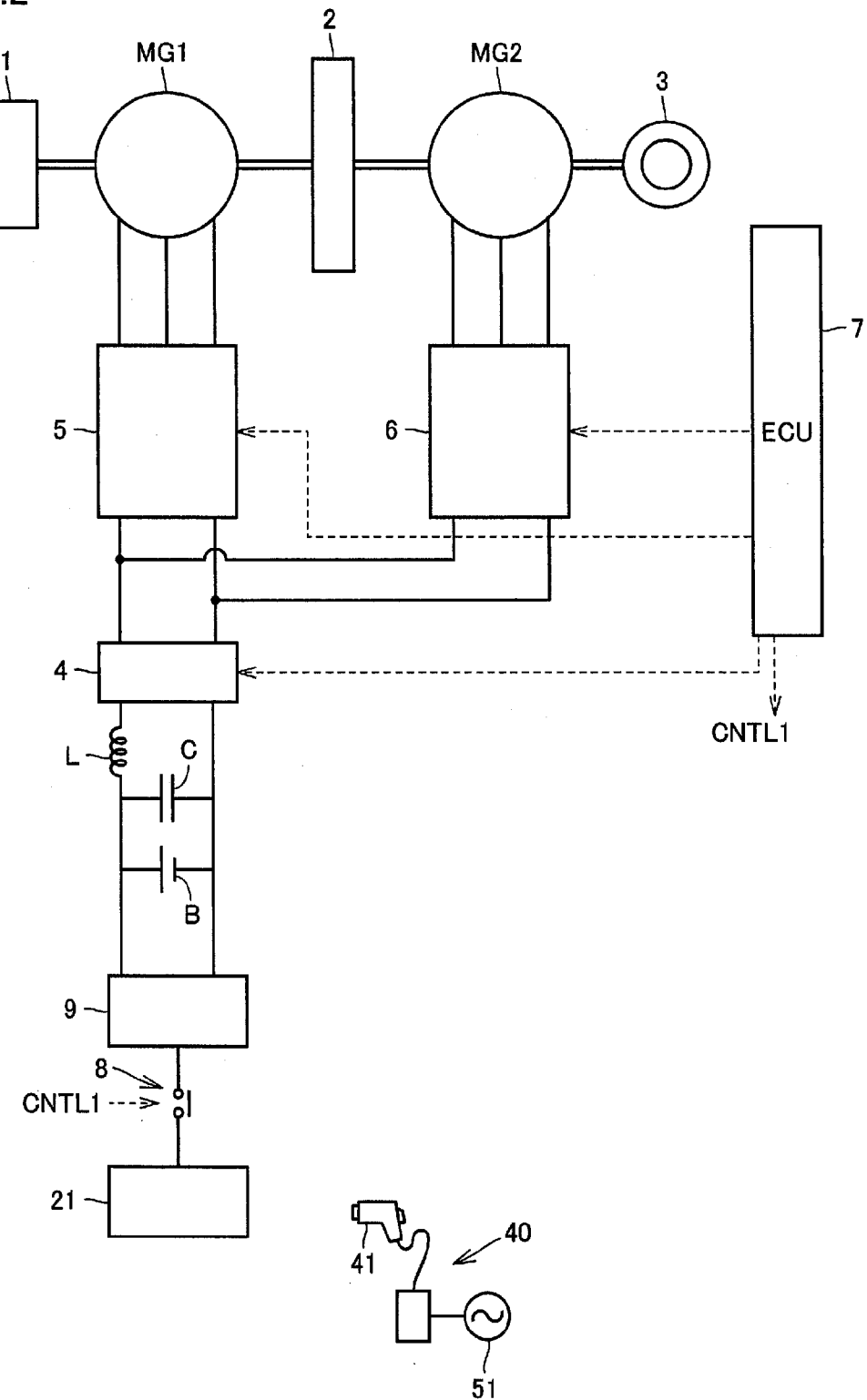
FIG. 2 is a block diagram of vehicle 10.

FIG. 2 is a block diagram of vehicle 10. Vehicle 10 includes an engine 1, motor generators MG1 and MG2, a power split device 2, battery B, a capacitor C, a reactor L, a converter 4, inverters 5 and 6, a vehicle ECU (Electronic Control Unit) 7, a switching element 8 such as a relay, a converter 9, and a charging unit 21.

Power split device 2 is coupled to engine 1 and motor generators MG1, MG2 for distributing motive power among them. For example, as power split device 2, a planetary gear mechanism having three rotation shafts of a sun gear, a planetary carrier and a ring gear is used. These three rotation shafts are connected to the rotation shafts of engine 1, and motor generators MG1, MG2, respectively. For example, by inserting the crankshaft of engine 1 through the center of a hollow rotor of motor generator MG1, engine 1 and motor generators MG1, MG2 can be mechanically connected to power split device 2.

In addition, the rotation shaft of motor generator MG2 is coupled to a front wheel 3 serving as a driving wheel by a reduction gear and a differential gear that are not shown. A reduction gear for the rotation shaft of motor generator MG2 may further be incorporated in power split device 2.

Motor generator MG1 is incorporated in vehicle 10 as a component that operates as a power generator driven by engine 1 and operates as an electric motor capable of starting engine 1. Motor generator MG2 is incorporated in vehicle 10 as an electric motor driving front wheel 3 serving as a driving wheel of vehicle 10.

Motor generators MG1 and MG2 each are a three-phase alternating-current (AC) synchronous motor, for example. Motor generators MG1 and MG2 each include a three-phase coil formed of a U-phase coil, a V-phase coil and a W-phase coil as a stator coil.

Motor generator MG1 generates a three-phase AC voltage using output from the engine, and outputs the generated three-phase AC voltage to inverter 5. Motor generator MG1 generates driving force by the three-phase AC voltage received from inverter 5, and starts engine 1.

Motor generator MG2 generates driving torque of the vehicle by the three-phase AC voltage received from inverter 6. Motor generator MG2 generates a three-phase AC voltage during regenerative braking of the vehicle, and outputs the generated voltage to inverter 6.

Switching element 8 is provided between converter 9 and charging unit 21, and connects and disconnects between charging device 40 and converter 9. Switching element 8 is switched by a control signal CNTL1 from vehicle ECU 7 so as to be turned ON/OFF. Converter 9 is controlled by vehicle ECU 7 to be driven.

When battery B is charged using charging plug 41 of charging device 40, vehicle ECU 7 turns ON switching element 8 to connect converter 9 and charging device 40. Then, vehicle ECU 7 drives converter 9 so as to convert the AC power supplied from the power supply into a DC power.

Figure 3:
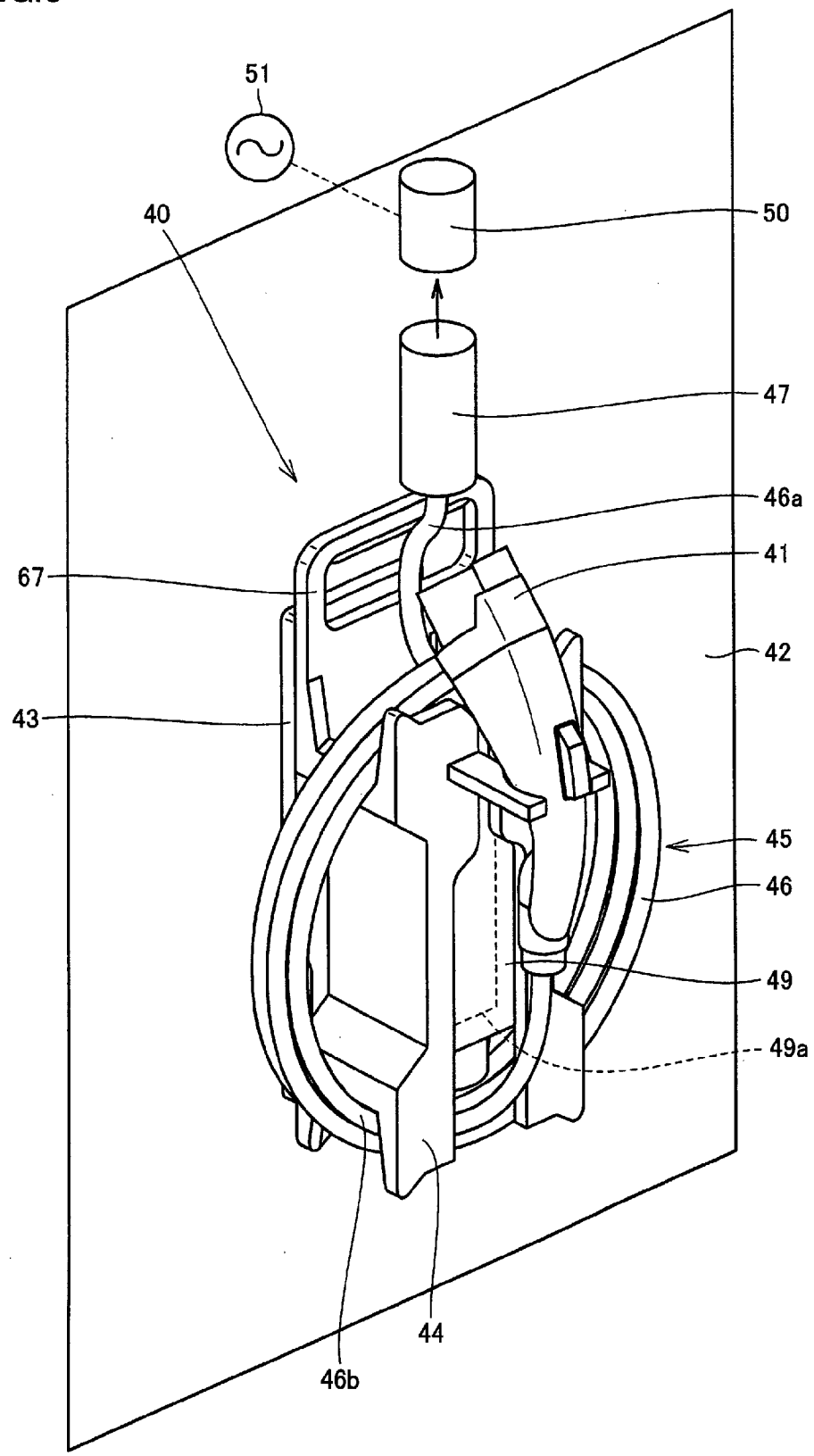
FIG. 3 is a perspective view of charging device 40.

FIG. 3 is a perspective view of charging device 40. As shown in this FIG. 3, charging device 40 includes a fixing plate 43 fixed to a wall portion 42 serving as a fixed object; a cable holder 44 mounted on this fixing plate 43 in an attachable and detachable manner; and a cable unit 45 mounted on cable holder 44 so as to be removable from cable holder 44. Wall portion 42 is, for example, an outer wall of a house and the like, an outer wall of a charging station and the like. Wall portion 42 may also be an inner wall of a housing case in which charging device 40 is housed.

Cable unit 45 includes a charging cable 46; a power supply plug 47 provided at one end of charging cable 46 and connected to a receptacle 50; a charging plug 41 provided at the other end of charging cable 46 and connected to charging connector 21a; a control unit 49a for controlling the amount of electric power supplied from power supply 51 to charging connector 21a; and a case 49 in which control unit 49a is housed.

Charging cable 46 includes a cable 46a connecting power supply plug 47 and case 49, and a cable 46b connecting case 49 and charging plug 41.

Control unit 49a housed within case 49 includes a charging circuit interrupt device (CCID). The charging circuit interrupt device serves as a device for switching between supply and cut-off of the electric power from power supply 51.

Case 49 is provided in a portion of charging cable 46 located between power supply plug 47 and charging plug 41.

Figure 4:
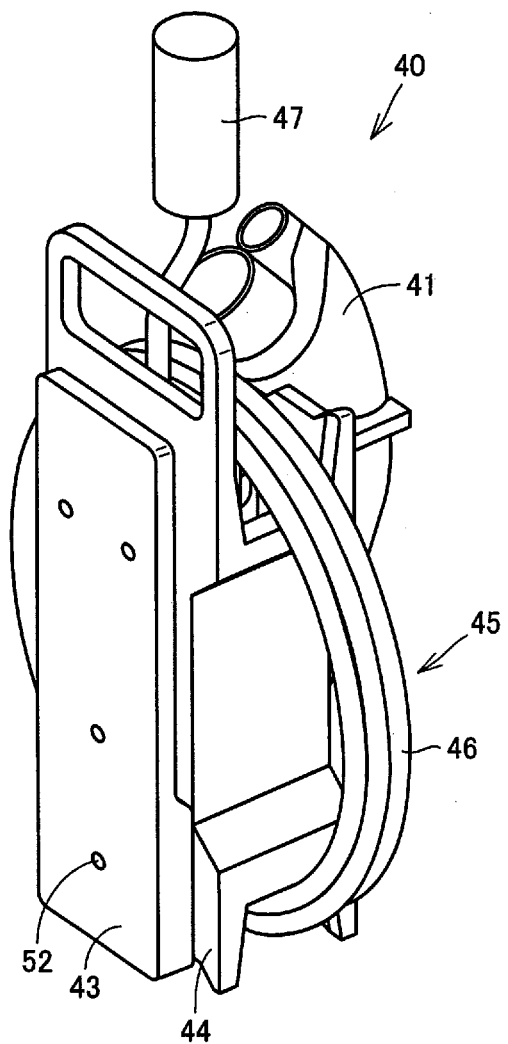
FIG. 4 is a perspective view of charging device 40 as seen from the side of a fixing plate 43.

FIG. 4 is a perspective view of charging device 40 as seen from the side of fixing plate 43. As shown in this FIG. 4, a plurality of holes 52 are provided in fixing plate 43. Bolts and the like that are not shown are inserted into holes 52. By these bolts, fixing plate 43 is fixed to wall portion 42.

Figure 5:
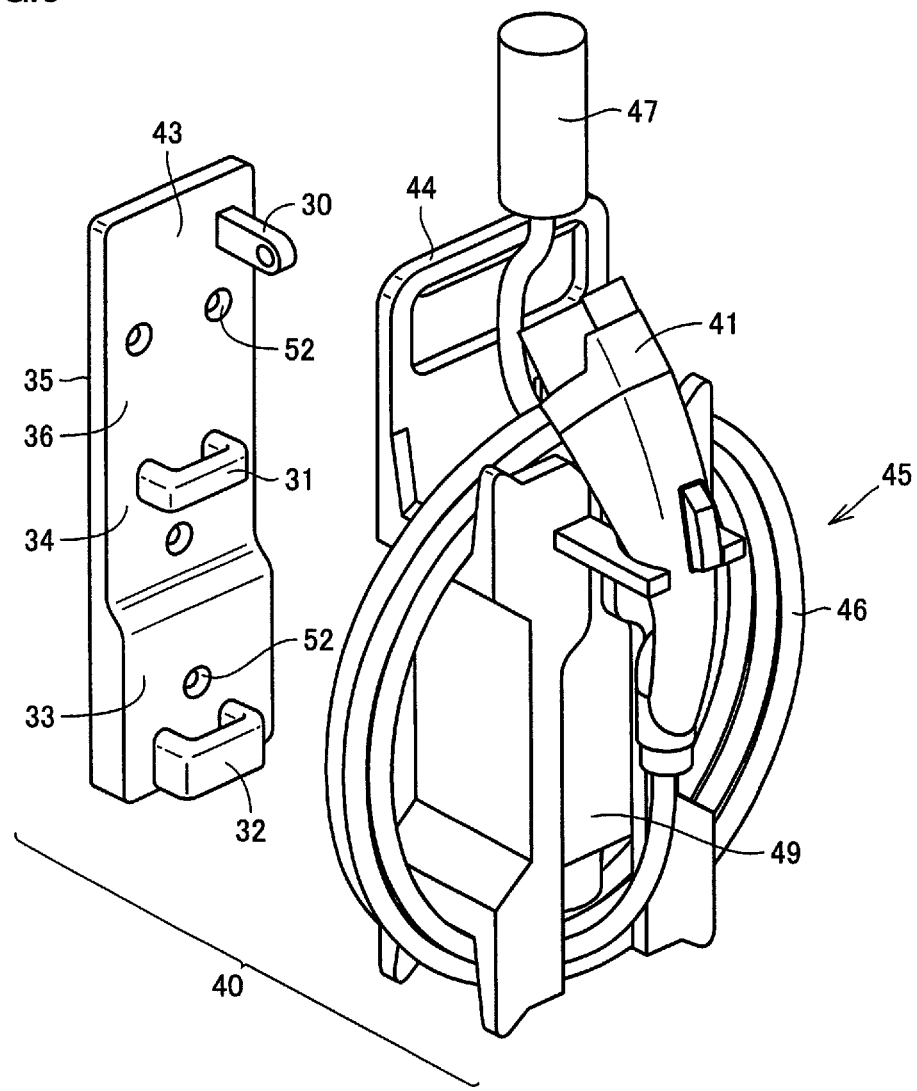
FIG. 5 is a perspective view of charging device 40 showing the state where cable holder 44 is removed from fixing plate 43.

FIG. 5 is a perspective view of charging device 40 showing the state where cable holder 44 is removed from fixing plate 43. As shown in this FIG. 5, fixing plate 43 is formed in a plate shape, and includes a fixing surface 35 fixed to wall portion 42, and a facing surface 36 facing fixing surface 35 in the thickness direction of fixing plate 43. Facing surface 36 faces the back surface wall of cable holder 44 when cable holder 44 is mounted on fixing plate 43.

Fixing plate 43 includes a thick plate portion 33, and a thin plate portion 34 formed on the upper side of thick plate portion 33 and less in thickness than thick plate portion 33. A receiving portion 32 is formed on the lower end side of thick plate portion 33, and a receiving portion 31 is formed on thin plate portion 34. Receiving portion 32 and receiving portion 31 each are opened upward. Receiving portion 31 is formed above receiving portion 32. A protrusion 30 protruding toward cable holder 44 is formed in a portion on facing surface 36 located on the upper end side of thin plate portion 34. Protrusion 30 is formed above receiving portion 31.

Cable holder 44 is provided in fixing plate 43 in an attachable and detachable manner. Cable holder 44 can be removed from fixing plate 43 in the state where cable unit 45 is mounted.

Figure 6:
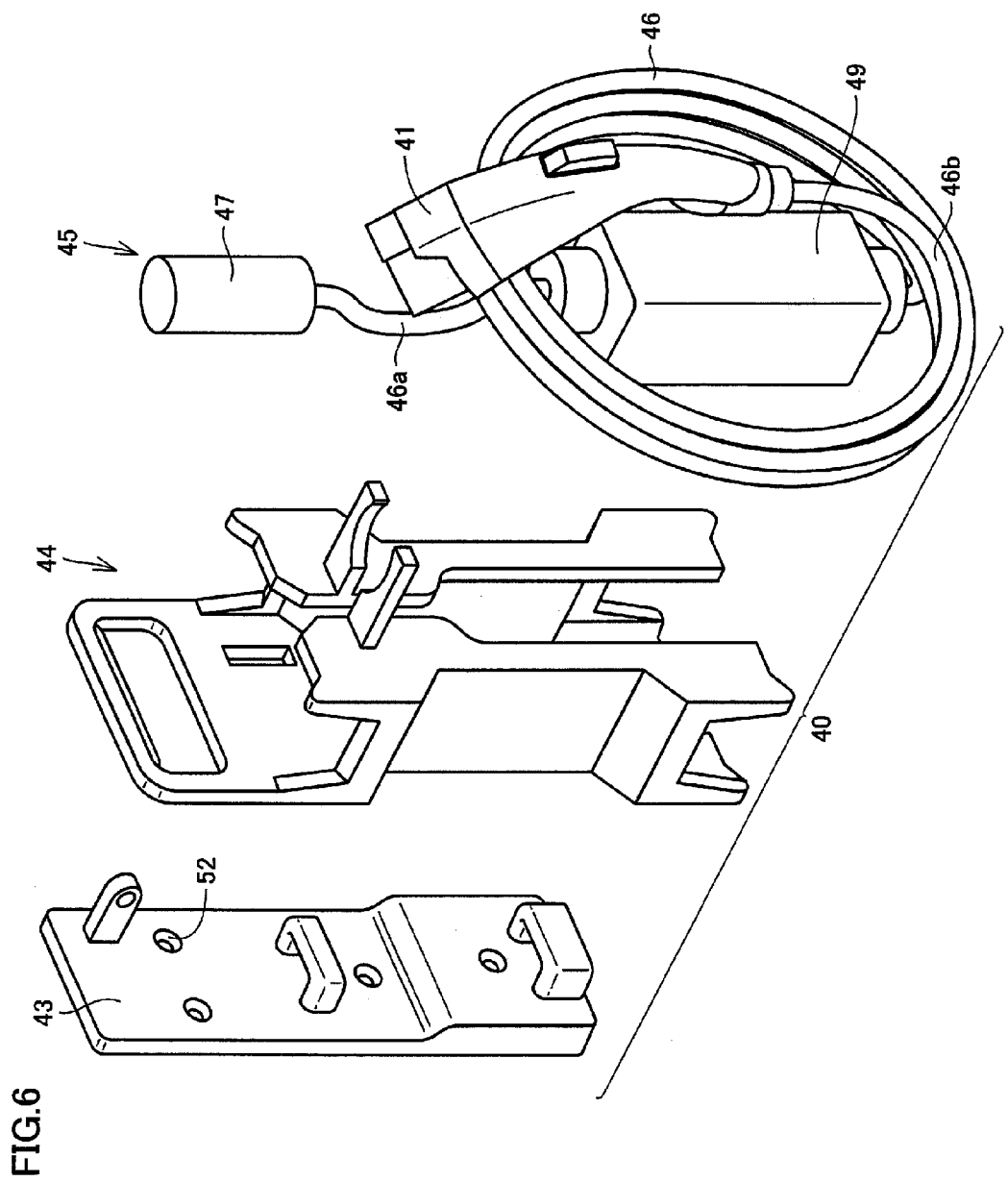
FIG. 6 is a perspective view showing the state shown in FIG. 5 from which cable holder 44 is removed.

FIG. 6 is a perspective view showing the state shown in FIG. 5 from which cable holder 44 is removed. As shown in this FIG. 6, cable unit 45 is removable from cable holder 44.

Figure 7:
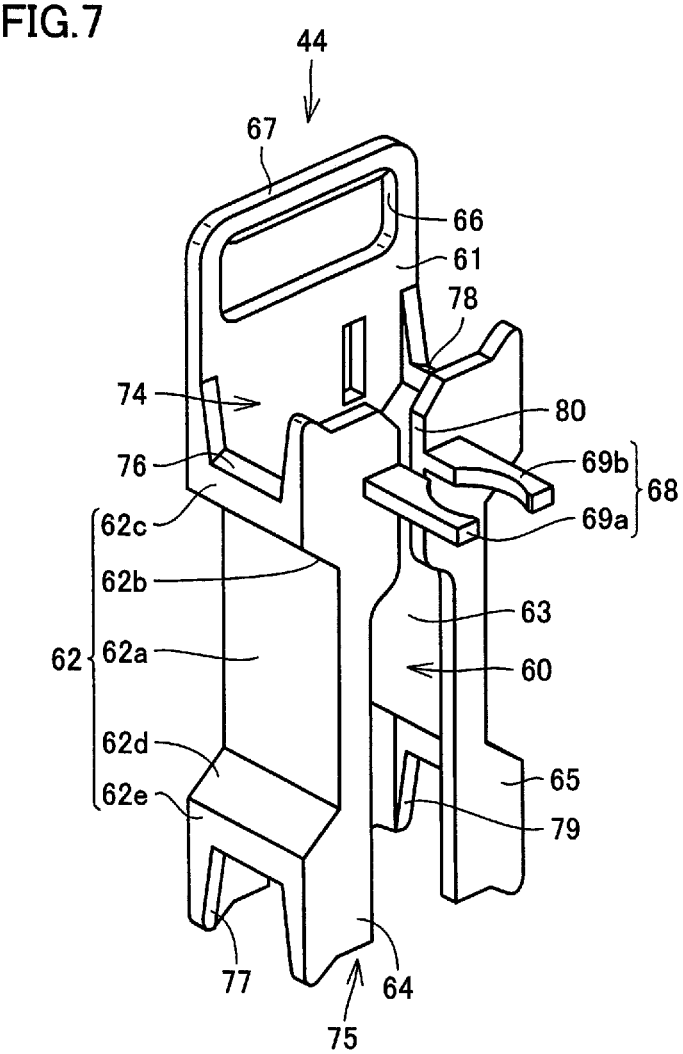
FIG. 7 is a perspective view of cable holder 44.

FIG. 7 is a perspective view of cable holder 44. In this FIG. 7, cable holder 44 includes a back surface wall 61; a side wall portion 62 formed upright from one lateral side of back surface wall 61, and a side wall portion 63 formed upright from the other lateral side of back surface wall 61. Furthermore, cable holder 44 includes a front wall portion 64 formed on the edge portion of side wall portion 62 and facing back surface wall 61, and a front wall portion 65 formed on the edge portion of side wall portion 63 and facing back surface wall 61.

Front wall portion 64 is provided on its upper end side with a support portion 69a protruding from front wall portion 64 in the forward direction. Front wall portion 65 is provided on its upper end side with a support portion 69b protruding from front wall portion 65 in the forward direction. These support portions 69a and 69b are arranged spaced apart from each other in the horizontal direction, and together form a holder 68 holding charging plug 41 shown in FIG. 6.

Back surface wall 61, side wall portion 62, side wall portion 63, front wall portion 64, and front wall portion 65 together form a housing space 60 in which case 49 is housed.

Side wall portion 62 includes a vertical wall 62a disposed in the middle of side wall portion 62 in the height direction; an inclined portion 62b formed at the upper end of vertical wall 62a; an upwardly extending portion 62c formed at the upper end of inclined portion 62d; an inclined portion 62d formed at the lower end of vertical wall 62a; and a downwardly extending portion 62e formed at the lower end of inclined portion 62d.

Inclined portion 62b is formed so as to be farther away from side wall portion 63 as extending upward. Inclined portion 62d is formed so as to be farther away from side wall portion 63 as extending downward. Upwardly extending portion 62c is provided on its upper side portion with a groove portion 76, and downwardly extending portion 62e is provided on its lower side portion with a groove portion 77.

Figure 8:
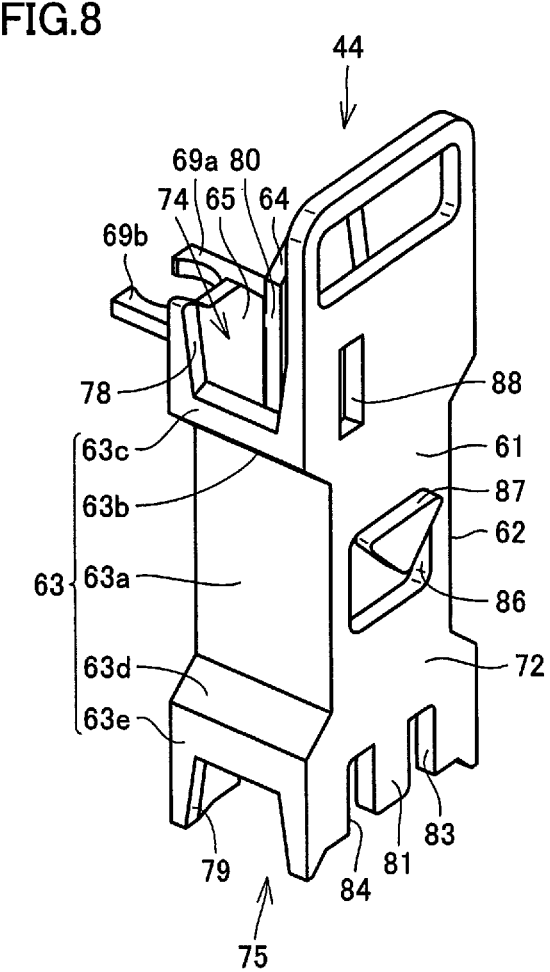
FIG. 8 is a perspective view of cable holder 44.

FIG. 8 is a perspective view of cable holder 44. As shown in this FIG. 8, side wall portion 63 includes a vertical wall 63a located in the middle of side wall portion 63 in the height direction; an inclined portion 63b formed on the upper side of vertical wall 63a; an upwardly extending portion 63c formed on the upper side of inclined portion 63b; an inclined portion 63d formed on the lower side of vertical wall 63a; and a downwardly extending portion 63e formed on the lower side of inclined portion 63d.

Inclined portion 63b is inclined so as to be farther away from side wall portion 62 as extending upward while inclined portion 63d is inclined so as to be farther away from side wall portion 62 as extending downward. Upwardly extending portion 63c is provided on its upper side with a groove portion 78, and downwardly extending portion 63e is provided on its lower side with a groove portion 79.

Then, back surface wall 61, an upper side portion of side wall portion 62, an upper side portion of side wall portion 63, an upper side portion of front wall portion 64, and an upper side portion of front wall portion 65 together form an opening 74 into which case 49 shown in FIG. 6 and the like is inserted. It is to be noted that opening 74 is opened upward. Furthermore, back surface wall 61, a lower side portion of side wall portion 62, a lower side portion of side wall portion 63, a lower side portion of front wall portion 64, and a lower side portion of front wall portion 65 together form an opening 75. A slit 80 is formed between front wall portion 64 and front wall portion 65. Charging cable 46 can pass through this slit 80. It is to be noted that slit 80 is disposed so as to extend between support portion 69a and support portion 69b.

Figure 9:
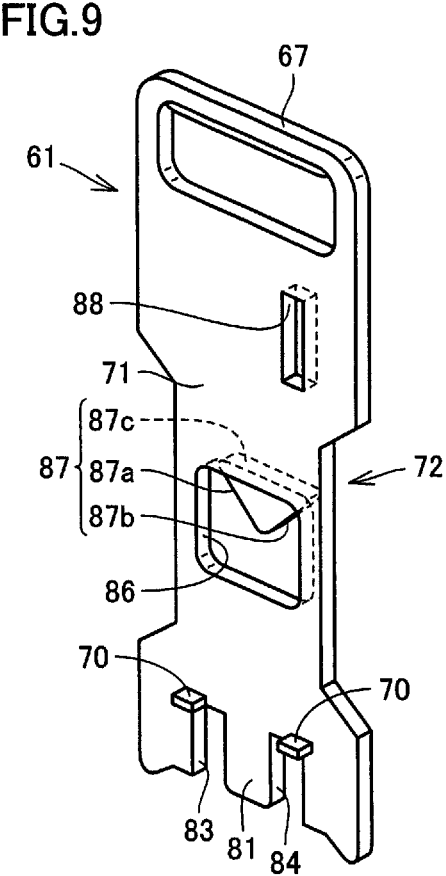
FIG. 9 is a perspective view of a back surface wall 61, specifically illustrating an inner surface of back surface wall 61.

FIG. 9 is a perspective view of back surface wall 61, specifically illustrating an inner surface of back surface wall 61. Although back surface wall 61 is formed integrally with side wall portion 63 and the like, only back surface wall 61 is shown and explained in FIG. 9 and the like for the sake of clarity. As shown in FIGS. 8 and 9, back surface wall 61 is formed in a plate shape, and includes a main surface 71 defining the inner surface of housing space 60, and a back surface 72 facing fixing plate 43.

Back surface wall 61 is provided on its lower side portion with a groove portion 83 and a groove portion 84 that are formed spaced apart from each other, and also with a protrusion 81 located between groove portions 83 and 84.

On main surface 71 of back surface wall 61, a support portion 70 supporting case 49 housed in housing space 60 is formed. This support portion 70 is formed directly above groove portions 83 and 84.

A window 86 is formed in a portion near the middle of back surface wall 61 in the height direction and located above protrusion 81. On the upper side portion of the opening edge on the window 86 side in back surface 72, a protrusion 87 is formed that protrudes downward.

Protrusion 87 is formed so as to be reduced in width as extending downward. Protrusion 87 includes an upper surface portion 87c, a side surface portion 87a and a side surface portion 87b. Upper surface portion 87c is connected to back surface 72 of back surface wall 61. Side surface portions 87a and 87b are formed such that the distance between these side surface portions is reduced as they extend from upper surface portion 87c in the downward direction. Protrusion 87 is formed so as to be reduced in width as extending downward. In this way, side surface portions 87a and 87b each are formed as an inclined surface.

An elongated hole 88 is formed in a portion of back surface wall 61 located above window 86 and protrusion 87. Elongated hole 88 passes through back surface wall 61, and is formed so as to extend in the height direction of back surface wall 61. A gripping portion 67 is formed above elongated hole 88.

In addition, protrusion 81 is inserted into receiving portion 32 shown in FIG. 5, protrusion 87 is inserted into receiving portion 31 shown in FIG. 5, and further, protrusion 30 shown in FIG. 5 is inserted into elongated hole 88, so that cable holder 44 is mounted on fixing plate 43 as shown in FIGS. 3 and 4.

Thus, an explanation will be given with reference to FIGS. 10 to 17, FIGS. 3 to 5 and the like with regard to a method of mounting cable unit 45 on cable holder 44, and a method of mounting cable holder 44 on fixing plate 43.

Figure 10:
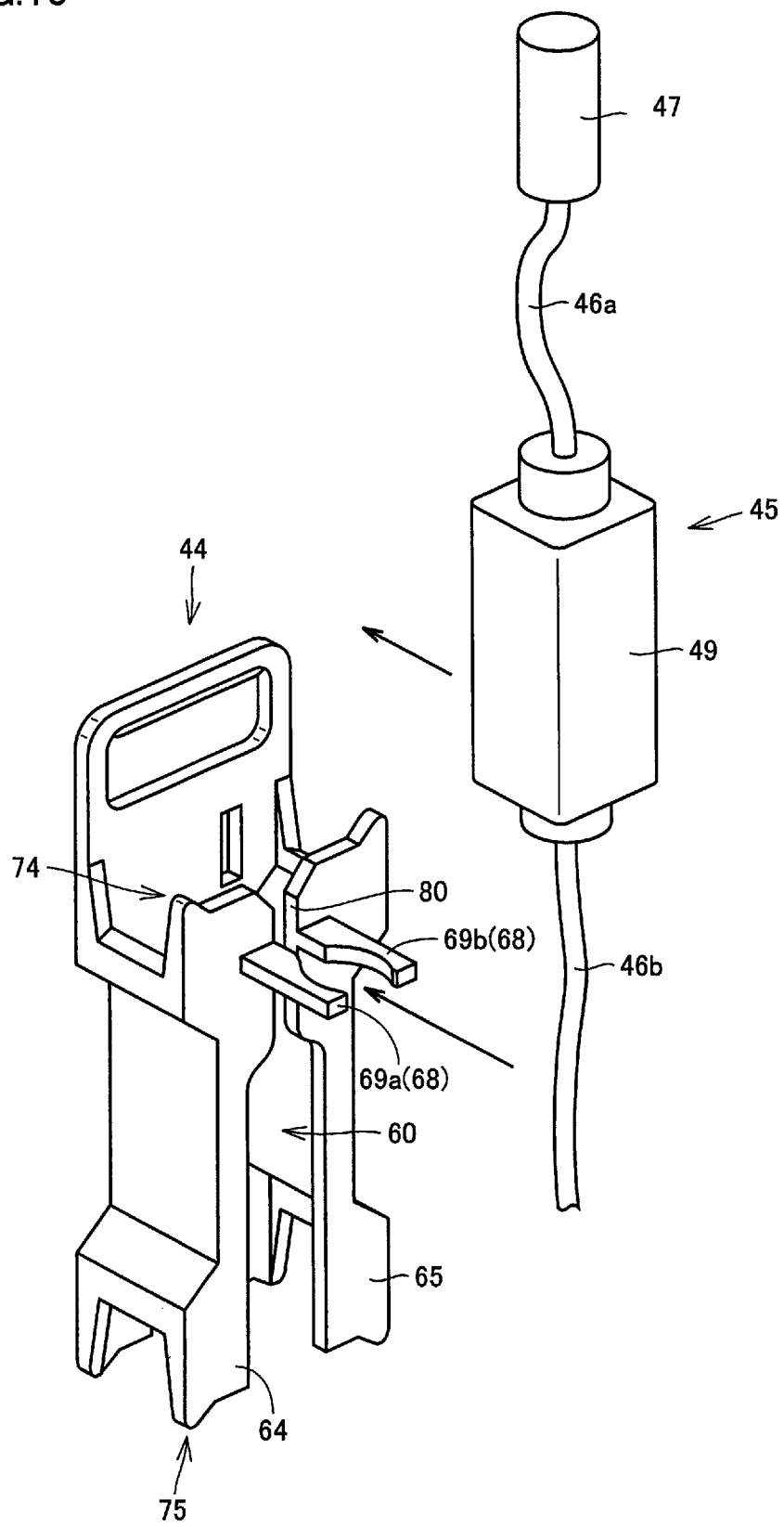
FIG. 10 is a perspective view illustrating the first procedure at the time when cable unit 45 is mounted on cable holder 44.
Figure 11:
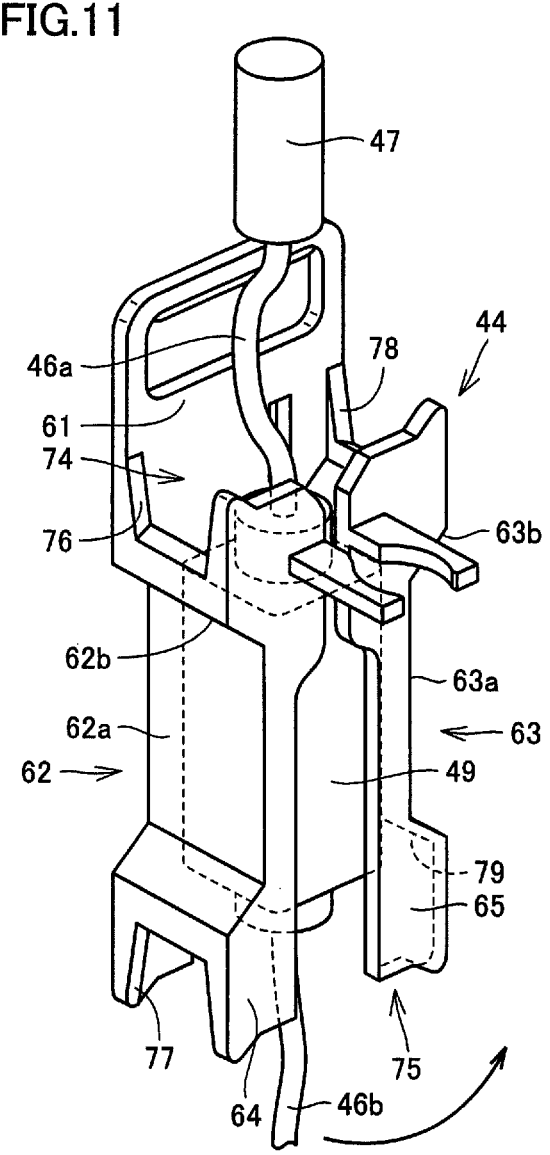
FIG. 11 is a perspective view illustrating the second procedure at the time when cable unit 45 is mounted on cable holder 44.

FIG. 10 is a perspective view illustrating the first procedure at the time when cable unit 45 is mounted on cable holder 44. As shown in this FIG. 10, cable 46b of cable unit 45 is caused to pass through slit 80 and inserted into housing space 60. Then, as shown in FIG. 11, case 49 is inserted into housing space 60 from above opening 74. Accordingly, the bottom surface of case 49 is supported by support portion 70 shown in FIG. 9, thereby mounting case 49 within cable holder 44.

In this case, the side surface of case 49 is supported by vertical walls 62a and 63a, thereby suppressing movement of case 49 in the lateral direction within cable holder 44 after case 49 is housed in cable holder 44.

In addition, since inclined portions 62b and 63b are formed such that the distance between these inclined portions is increased as they extend upward, opening 74 is relatively wide so that case 49 is readily inserted through this opening 74. Then, cable 46b hangs down from opening 75.

As shown in this FIG. 11, after case 49 is mounted within cable holder 44, cable 46b is wound around cable holder 44.

Specifically, cable 46b is wound around cable holder 44 such that this cable 46b passes sequentially through groove portion 79, on side wall portion 63, groove portion 78, groove portion 76, on side wall portion 62, and groove portion 77. Accordingly, cable 46b is disposed between front wall portions 64, 65 and back surface wall 61, and extends along side wall portions 62 and 63.

Figure 12:
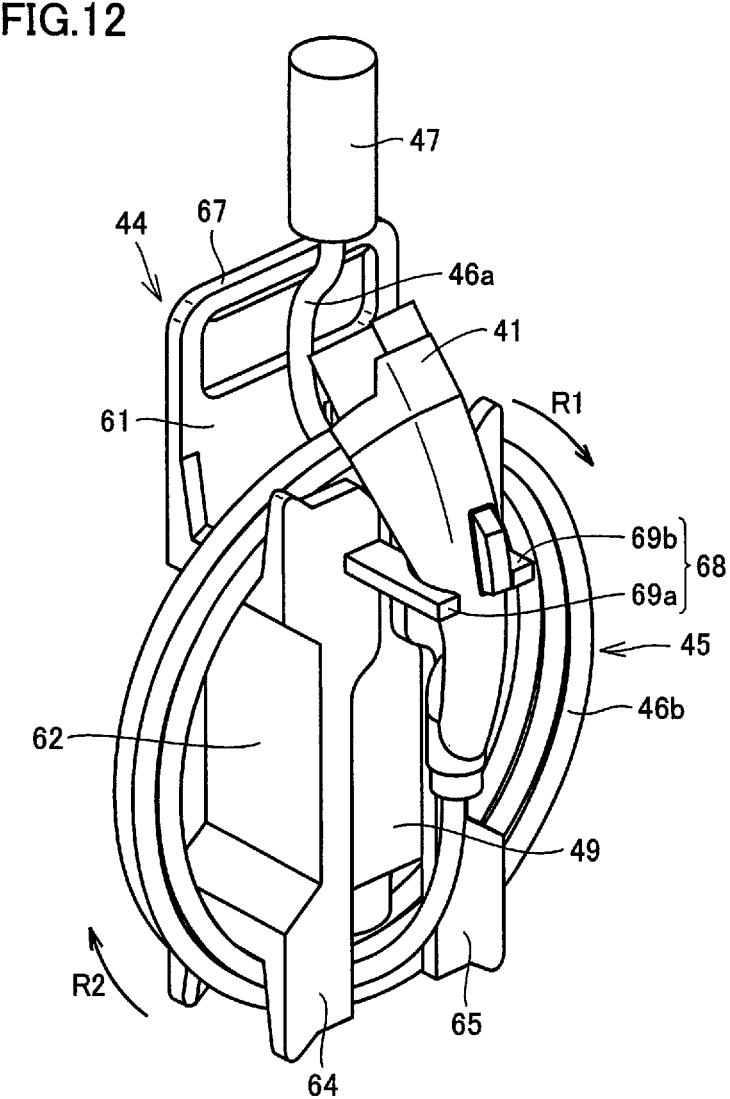
FIG. 12 is a perspective view illustrating the third procedure at the time when cable unit 45 is mounted on cable holder 44.

Then, charging plug 41 is mounted on holder 68 as shown in FIG. 12. In this case, charging plug 41 protrudes above cable 46b wound around cable holder 44. Specifically, charging plug 41 is disposed so as to protrude above cable 46b wound around cable holder 44. Consequently, it becomes possible to suppress loosening of cable 46b wound around cable holder 44.

Furthermore, in FIGS. 11 and 12, cable 46b is inserted into groove portions 77 and 79 in the state where cable unit 45 is mounted on cable holder 44. Then, when this cable holder 44 is disposed on the ground surface, the lower end of cable holder 44 comes into contact with the ground surface at the corner portions of back surface wall 61 and side wall portion 62, the corner portions of side wall portion 62 and front wall portion 64, the corner portions of front wall portion 65 and side wall portion 62, and the corner portions of back surface wall 61 and side wall portion 63. Accordingly, also when cable unit 45 is mounted on cable holder 44, cable holder 44 can be free-standing on the ground surface. In this way, each corner portion of the lower end of cable holder 44 functions as an installation portion. Although an explanation has been given with regard to the case where a ground surface is typically defined as a non-holding surface on which cable unit 45 is disposed, cable unit 45 can be of course placed at various places.

Referring to FIGS. 13 to 16, an explanation will be hereinafter given with regard to a method of mounting cable unit 45 on cable holder 44, and then, mounting cable holder 44 on fixing plate 43. In FIGS. 13 to 16, for the sake of explanation, only fixing plate 43 and back surface wall 61 of cable holder 44 are shown, but other portions of cable holder 44 are not shown.

In this case, when cable holder 44 equipped with cable unit 45 as shown in FIG. 12 is gripped at gripping portion 67, the upper end side of cable holder 44 tends to be displaced in a rotation direction R1 with respect to the lower end side while the lower end side of cable holder 44 tends to be displaced in a rotation direction R2 with respect to the upper end side. This is because the center of gravity of cable holder 44 equipped with cable unit 45 is located relatively forward.

Figure 13:
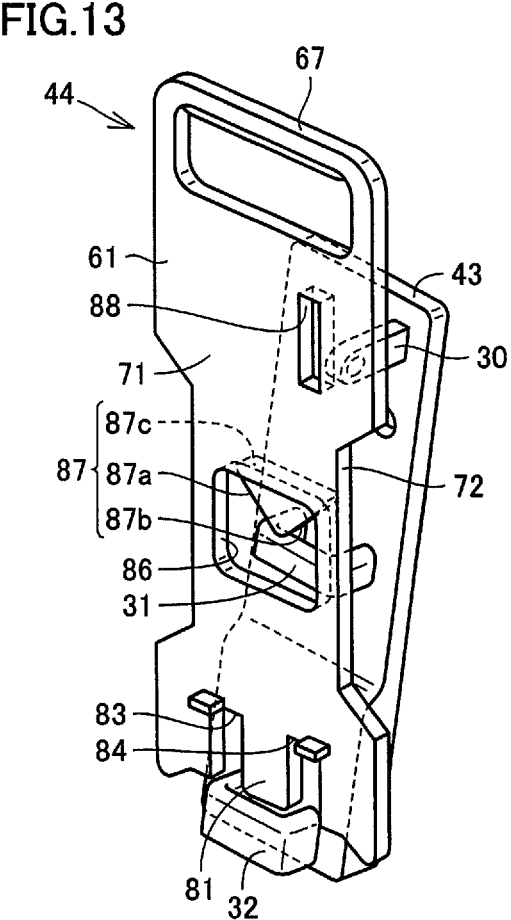
FIG. 13 is a perspective view schematically illustrating the first procedure at the time when cable holder 44 is mounted on fixing plate 43.

Consequently, as shown in FIG. 13, when cable holder 44 is to be mounted on fixing plate 43, the upper end of back surface wall 61 is separated away from fixing plate 43, and the lower end of back surface wall 61 comes close to fixing plate 43.

Accordingly, when cable holder 44 is to be mounted on fixing plate 43, an operator can easily visually identify protrusion 81 from above cable holder 44, and therefore, can align protrusion 81 with the opening of receiving portion 32 without difficulty. Furthermore, since receiving portion 32 is formed in thick plate portion 33, the operator can easily visually identify receiving portion 32, and therefore, can align receiving portion 32 with protrusion 81 without difficulty.

Figure 14:
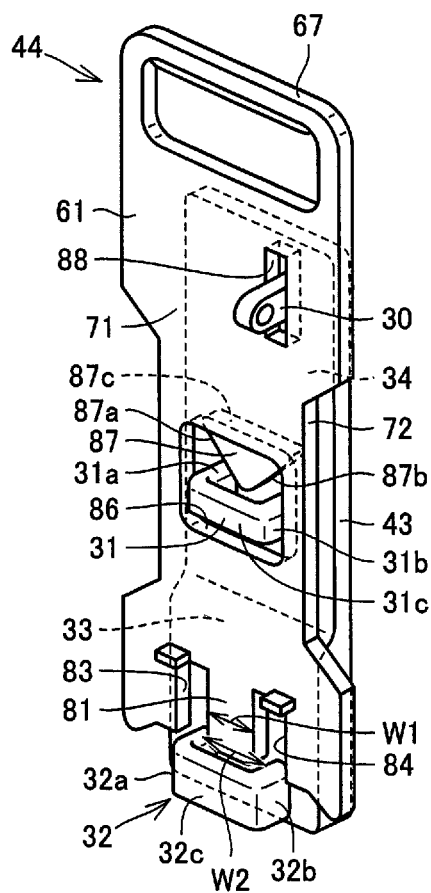
FIG. 14 is a perspective view schematically illustrating the second procedure at the time when cable holder 44 is mounted on fixing plate 43.

Then, cable holder 44 is pressed against fixing plate 43 such that back surface wall 61 of cable holder 44 extends along fixing plate 43 as shown in FIG. 14. In this case, receiving portion 31 is formed in thin plate portion 34. Accordingly, even if cable holder 44 is pressed against fixing plate 43, the operator can visually identify receiving portion 31 and protrusion 87 from above. In this case, protrusion 87 is disposed above the opening of receiving portion 31 at a distance therefrom. A part of receiving portion 31 is inserted into window 86. Receiving portion 31 includes a side surface portion 31a and a side surface portion 31b that are arranged in the width direction; and a front surface portion 31c inserted into window 86. In this case, protrusion 30 passes through elongated hole 88 while the lower end of protrusion 81 is located directly above receiving portion 32.

Receiving portion 32 includes a side surface portion 32a and a side surface portion 32b that are arranged in the width direction; and a front surface portion 32c provided continuously to side surface portions 32a and 32b. Then, when cable holder 44 is lowered from the state shown in FIG. 14, side surface portion 32a starts to be inserted into groove portion 83, and side surface portion 32b starts to be inserted into groove portion 84. Also, protrusion 81 starts to be inserted into receiving portion 32. On the other hand, protrusion 87 is moved to immediately above the opening of receiving portion 31.

In this case, since protrusion 81 has a width W1 smaller than an opening width W2 of the opening in receiving portion 32, the operator can readily insert protrusion 81 into receiving portion 32.

Furthermore, when cable holder 44 is lowered, the lower end of protrusion 87 starts to be inserted into receiving portion 31. Furthermore, protrusion 30 starts to be relatively displaced toward the upper end of elongated hole 88. Protrusion 87 is provided with side surface portions 87a and 87b that are inclined such that the distance between these side surface portions is reduced as they extend downward. Accordingly, also in the case where protrusion 87 is located not correctly in the center of receiving portion 31, one of side surface portions 87a and 87b is brought into contact with side surface portions 31a and 31b of receiving portion 31, to displace cable holder 44 such that the end of protrusion 87 is located in the center of receiving portion 31.

Accordingly, even if cable holder 44 is misaligned, cable holder 44 can be displaced to a prescribed position.

Figure 15:
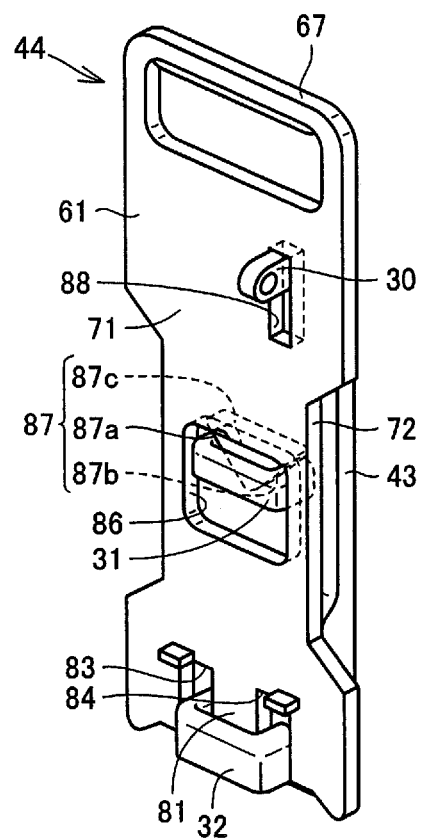
FIG. 15 is a perspective view schematically illustrating the third procedure at the time when cable holder 44 is mounted on fixing plate 43.

Then, as shown in FIG. 15, when cable holder 44 is further lowered, protrusion 81 is inserted into receiving portion 32 and protrusion 87 is inserted into receiving portion 31. Furthermore, protrusion 30 reaches the upper end of elongated hole 88, and then, the operation of mounting cable holder 44 on fixing plate 43 is completed.

In this case, when cable holder 44 is mounted on fixing plate 43, the upper end of side surface portion 87a shown in FIG. 14 is brought into contact with side surface portion 31a while the upper end of side surface portion 87b is brought into contact with side surface portion 31b. Consequently, rattling of back surface wall 61 in the width direction is suppressed.

Figure 16:
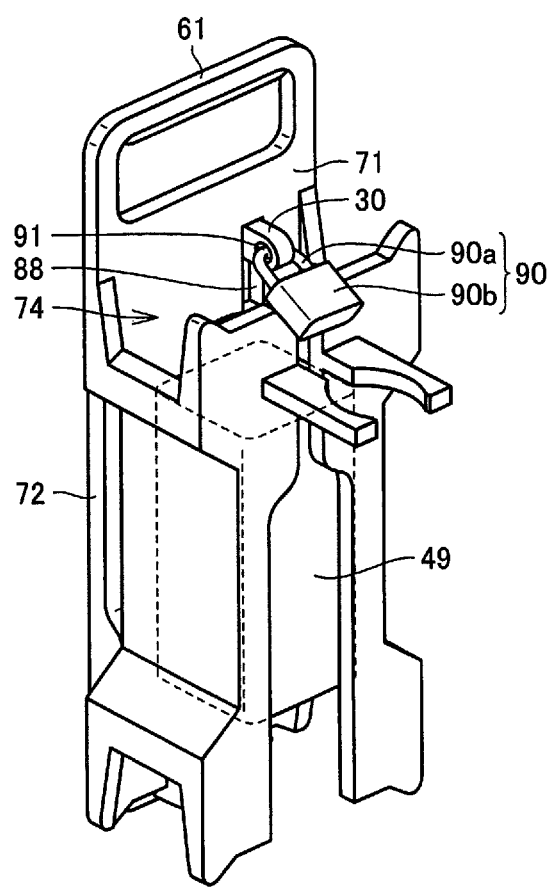
FIG. 16 is a perspective view showing the state where cable holder 44 equipped with cable unit 45 is mounted on fixing plate 43.
Figure 17:
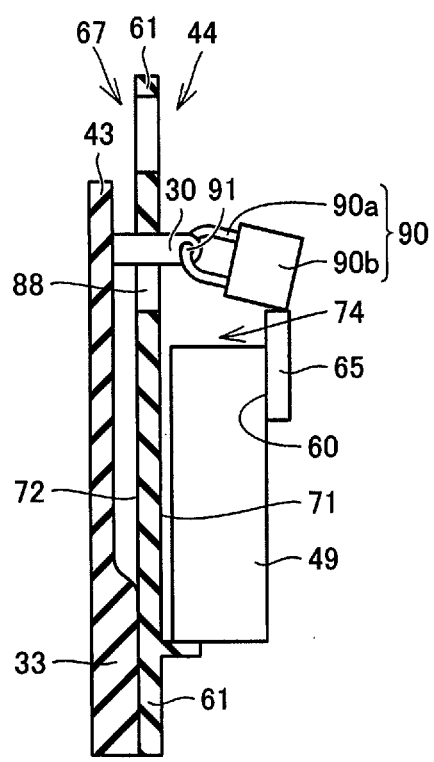
FIG. 17 is a cross-sectional view showing cable holder 44 and fixing plate 43 shown in FIG. 16.

FIG. 16 is a perspective view showing the state where cable holder 44 equipped with cable unit 45 is mounted on fixing plate 43. In this FIG. 16, charging cable 46, power supply plug 47 and the like of cable unit 45 are not shown. FIG. 17 is a cross-sectional view showing cable holder 44 and fixing plate 43 shown in FIG. 16.

As shown in FIGS. 16 and 17, protrusion 30 passes through elongated hole 88 and protrudes from main surface 71. Since protrusion 30 is inserted into elongated hole 88, the range of upward displacement of cable holder 44 is limited. Furthermore, since protrusion 87 is inserted into receiving portion 31 and protrusion 81 is inserted into receiving portion 32 as shown in FIG. 15, rattling of cable holder 44 is suppressed in the state where cable holder 44 is mounted on fixing plate 43. Protrusion 30 is located above case 49 located within housing space 60.

Accordingly, even if case 49 is to be pulled out from opening 74, it is difficult to pull out case 49 from cable holder 44 since case 49 interferes with protrusion 30.

Furthermore, a hole 91 is formed at a portion of the end of protrusion 30 that protrudes from main surface 71. A lock 90 is attached to this hole 91. Although an explanation will be given with regard to an example in which a hole is provided at the end of protrusion 30 as a configuration for attaching lock 90, it goes without saying that various types of shapes can be employed as a configuration for attaching a device such as lock 90.

Lock 90 includes an insertion shaft 90a inserted into hole 91 and a lock body 90b engaging with insertion shaft 90a.

Insertion shaft 90a, which is formed in a U-shape, has one end provided in lock body 90b in a rotatable manner and the other end inserted into a hole provided in lock body 90b in an attachable and detachable manner. Lock body 90b is provided with a keyhole (not shown), into which a prescribed key is inserted, thereby allowing disengagement between the other end of insertion shaft 90a and lock body 90b.

In this way, by attaching lock 90 to protrusion 30, protrusion 30 can be suppressed from coming off from elongated hole 88, so that removal of cable holder 44 from fixing plate 43 can be suppressed.

Then, referring to each figure, the procedure of removing cable holder 44 mounted on fixing plate 43 and the procedure of removing cable unit 45 mounted on cable holder 44 will then be described. As shown in FIGS. 3 and 17, when cable holder 44 mounted on fixing plate 43 is to be removed, lock 90 is removed from protrusion 30.

Then, gripping portion 67 is gripped to pull cable holder 44 upward. At this time, since thick plate portion 33 formed to protrude toward cable holder 44 is formed on fixing plate 43, there is a gap formed between cable holder 44 and wall portion 42, through which a user's finger can be inserted. Accordingly, the user can easily grip the gripping portion. Then, by pulling cable holder 44 upward, protrusion 87 is pulled out from receiving portion 31 and protrusion 81 is also pulled out from receiving portion 32, as shown in FIG. 14. Then, by pulling out cable holder 44 in the forward direction, cable holder 44 can be easily removed from fixing plate 43 as shown in FIG. 5.

Then, as shown in FIG. 11, cable 46b is removed from cable holder 44. As shown in FIG. 10, case 49 is then pulled out from opening 74, and cable 46b is subsequently removed through slit 80 to outside. In this way, cable unit 45 can be easily removed from cable holder 44.

Although an explanation has been given in the present embodiment with regard to an example in which cable unit 45 can be removed from cable holder 44, the present invention is not limited to this example. For example, cable unit 45 may be connected to cable holder 44, and this cable holder 44 may be attachable to and detachable from fixing plate 43.

In charging device 40 configured in this way, the operator removes cable holder 44 from fixing plate 43. Then, at a working place, the operator appropriately pulls out charging plug 41 and charging cable 46 from cable holder 44, and connects them to cable holder 44 of the vehicle. Furthermore, the operator pulls out power supply plug 47 from cable holder 44, and connects power supply plug 47 to receptacle 50.

When the charging operation is completed, the operator winds charging cable 46 around cable holder 44 and mounts charging plug 41 on cable holder 44. Then, the operator mounts cable holder 44 on fixing plate 43.

In this way, even in the case of charging device 40 in which charging cable 46 is connected to cable holder 44, cable holder 44 can be freely carried, thereby allowing improvement in the working efficiency.

It should be understood that the embodiments disclosed herein are illustrative and non-restrictive in every respect. The scope of the present invention is defined by the terms of the claims, and is intended to include any modifications within the scope and meaning equivalent to the terms of the claims. Furthermore, the above-described numerical values are merely by way of example and not limited to the above-described numerical values and the ranges.

Industrial Applicability

The present invention is applicable to a charging device.

REFERENCE SIGNS LIST 1 engine, 2 power split device, 3 front wheel, 4 converter, 5, 6 inverter, 8 switching element, 9 converter, 11 body, 12 upper surface, 13 lower surface, 14 peripheral surface, 15, 16 side surface, 17 front surface, 18 back surface 20 oil feeding portion, 20a nozzle insertion portion, 20b, 21b cover portion, 21 charging unit, 21a charging connector, 22 passenger entry/exit opening, 23, 24 door, 30, 81, 87 protrusion, 31, 32 receiving portion, 33 thick plate portion, 34 thin plate portion, 40 charging device, 41 charging plug, 42 wall portion, 43 fixing plate, 44 cable holder, 45 cable unit, 46 charging cable, 46a, 46b cable, 47 power supply plug, 49 case, 50 receptacle, 51 power supply, 52, 91 hole, 60 housing space, 61 back surface wall, 62, 63 side wall portion, 62a, 63a vertical wall, 62b, 62d, 63b, 63d inclined portion, 62c, 63c upwardly extending portion, 62e, 63e downwardly extending portion, 64, 65 front wall portion, 67 gripping portion, 68 holder, 69a, 69b, 70 support portion, 71, 72 main surface, 74, 75 opening, 76, 77, 78, 79, 83, 84 groove portion, 80 slit, 86 window, 87a, 87b side surface portion, 87c upper surface portion, 88 elongated hole, 90 lock, 90a insertion shaft, 90b lock body.

The invention claimed is:

1. A charging device comprising:
a fixing member fixed to a fixed object;
a cable holder mounted on said fixing member in an attachable and detachable manner; and
a charging cable unit provided in said cable holder and connected to a charging unit provided in a vehicle,
said cable holder including a back surface facing said fixing member in a state where the cable holder is mounted on said fixing member, and a gripping portion,
said fixing member being provided with a protruding portion protruding toward said cable holder,
when said protruding portion is brought into contact with said cable holder in a state where said cable holder is mounted on said fixing member, a gap being provided between said gripping portion and said fixed object,
said cable holder including the back surface facing said fixing member in a state where the cable holder is mounted on said fixing member, a first protrusion formed on said back surface and protruding downward, and a second protrusion formed above said first protrusion and protruding downward,
said fixing member including a facing surface facing said back surface, a first receiving portion formed on said facing surface and receiving said first protrusion, and a second receiving portion receiving said second protrusion, and
said first receiving portion being formed on said protruding portion, and said second receiving portion being formed above said protruding portion.

2. The charging device according to claim 1, wherein said charging cable unit is provided so as to be removable from said cable holder.

3. The charging device according to claim 1, wherein
said charging cable unit includes a cable, a control unit connected to said cable and controlling electric power supplied to said charging unit, and a case housing said control unit, and
a case housing portion housing said case is formed inside said cable holder.

4. The charging device according to claim 3, wherein
said charging cable unit includes a cable; a first connecting portion provided at a first end of said cable and connected to a power supply; a second connecting portion provided at a second end of said cable and connected to the charging unit provided in the vehicle; a control unit disposed between said first end and said second end and controlling electric power supplied to said charging unit; and a case housing said control unit,
said cable is wound around a peripheral surface of said cable holder,
said cable holder includes a holding portion holding said second connecting portion, and
said second connecting portion mounted on said holding portion protrudes above the cable wound around said cable holder.

5. The charging device according to claim 3, wherein
said cable holder has a lower end at which a groove portion receiving said cable and an installation portion are formed, and
said installation portion protrudes below said cable within said groove portion, and when said installation portion is disposed on a non-holding surface in a state where said cable is mounted on said case housing portion, said cable holder can be free-standing.

6. The charging device according to claim 3, wherein said charging cable unit includes a cable; a first connecting portion provided at a first end of said cable and connected to a power supply; a second connecting portion formed at a second end of said cable and connected to said charging unit; a control unit disposed in said cable between said first end and said second end; and a case housing said control unit, said case housing portion is provided with an insertion hole into which said case is inserted from above, and a slit formed so as to extend from an upper end to a lower end of said case housing portion, and a part of said cable located between said case and said second connecting portion can pass through said slit.

7. The charging device according to claim 1, wherein said first protrusion is formed at a lower end of said back surface, said back surface has a window formed above said first protrusion, and said second protrusion is formed on an upper side portion of an opening of said window.

8. The charging device according to claim 1, wherein said second protrusion includes a first side surface and a second side surface arranged in a width direction, and said first side surface and said second side surface are formed to be inclined so as to come close to each other as extending downward.

9. The charging device according to claim 8, wherein said second receiving portion includes a first side wall portion and a second side wall portion arranged in a width direction, and when said second protrusion is inserted into said second receiving portion, an upper end of said first side surface and an upper end of said second side surface are brought into contact with said first side wall portion and said second side wall portion, respectively.

10. The charging device according to claim 1, wherein said cable holder includes a back surface facing said fixing member in a state where the cable holder is mounted on said fixing member, and a through hole provided in said back surface, said fixing member includes a facing surface facing said back surface of said cable holder in a state where said cable holder is mounted, and a third protrusion formed on said facing surface and protruding toward said back surface, and when said cable holder is mounted on said fixing member, said third protrusion is inserted into said through hole.

* * * * *